United States Patent

[11] 3,633,169

[72] Inventor William J. Bickford
Weston, Mass.

[21] Appl. No. 41,344
[22] Filed May 28, 1970
[45] Patented Jan. 4, 1972
[73] Assignee Raytheon Company
Lexington, Mass.

[54] DEMAND ACCESS DIGITAL-COMMUNICATIONS SYSTEM
28 Claims, 7 Drawing Figs.

[52] U.S. Cl. ........ 340/172.5
[51] Int. Cl. ........ G06f 3/04
[50] Field of Search ........ 340/172.5

[56] References Cited

UNITED STATES PATENTS

| | | | |
|---|---|---|---|
| 3,337,854 | 8/1967 | Cray et al. | 340/172.5 |
| 3,400,372 | 9/1968 | Beausoleil et al. | 340/172.5 |
| 3,528,060 | 9/1970 | Streil | 340/172.5 |
| 3,534,337 | 10/1970 | Martin et al. | 340/172.5 |
| 3,544,976 | 12/1970 | Collins | 340/172.5 |

*Primary Examiner*—Gareth D. Shaw
*Assistant Examiner*—Paul R. Woods
*Attorneys*—Milton D. Barlett, Joseph D. Pannone and Jeffrey P. Morris

ABSTRACT: This disclosure relates to a multiparty data-transmission system in which a central location controls the communication traffic in a transmission loop while at the same time permitting remote locations to independently request transmission privileges or "demand access" to the communications loop without interference or message overlap either with demand access requests originating at other remote locations or with other data which may be present on the transmission line, whether destined to or from the central location.

DEMAND ACCESS DIGITAL-COMMUNICATIONS SYSTEM

BACKGROUND AND SUMMARY OF THE INVENTION

This invention relates to a multiparty data-transmission system in which a central location controls the communication traffic in a series connected transmission loop, and at the same time permits remote locations to request transmission privileges or "demand access" to the communications loop.

This invention is particularly useful in airline reservation systems and other applications where there is a multiplicity of subscriber or agent stations and one or more central stations in which efficient two-way automatic data transmission is essential. One of the problems present in such systems is that any given subscriber may have an agent-to-central message to send which if sent without caution may overlap another message that starts at or near the same time.

The problem is overcome in the present invention wherein a digital-communication system is provided in which transmitted data and system central messages cannot overlap any messages of any type, but in which local stations freedom to request to send messages may be transmitted at any time. This is accomplished in one embodiment by means of a delay such as a shift register inserted in each station which allows an operator to view a span of data traffic long enough to insert a demand access message. If no data is present along the span viewed, then permission to transmit the message is granted by the central location and the message is automatically transmitted, while transmission is withheld in the event that data either from another remote sources or from the central location is present on the span viewed. The central location is present the remote access points to initiate short messages without permission but long messages need permission since short messages are stored in a central storage unit while long messages are transmitted.

In another embodiment, a novel modem controller and display controller enable the local station computers to be programmed compatible with the programming of a central computer to enable the avoidance of message overlap by the system control provided by the system software.

Prior art systems in which a plurality of remote stations are serially connected to a data-processing unit or computer are characterized by the polling of remote stations from the computer, thereby consuming valuable transmission line time to inquire of all stations by some cyclic manner whether or not there are any messages to be sent. This polling process of the prior art also individually establishes at each remote location the condition for the transmission of each individual message.

The subject invention provides a means for each station to request or demand access for time on the transmission system while at the same time permitting the computer to regulate traffic. This results in a system in which only stations with messages to send are scheduled to send.

The three most common polling methods of the prior art are direct-polling, hub-polling, and round-robin-type systems. In systems which employ direct polling, a plurality of transmitter-receiver pairs are all connected in parallel with the transmitter and receiver of the central processing unit. In this arrangement, the transmitter of the central processing unit sends a first transmission to a first receiver at a first station. In the event that this station has information to transmit to the central processing unit, a transmitter at the first station is activated, thereby transmitting the information in a first closed communications loop back to the central processing unit. The central processing unit then polls the second station in a like manner by transmitting a second signal to the receiver at the second station. The second station transmitter will transmit its information once polled along a second closed transmission loop in parallel with the first transmission loop back to the central processing unit. Any number of parallel connected stations may be polled in this manner. However, a separate signal must be transmitted for each station to be polled.

A carrier must exist on the transmission line between the transmitter at the central processing unit and the parallel receivers at all times, since the parallel receivers may be polled at any time. Once the system is turned on, these remote station receivers are always in bit synchronism with the central processing unit transmitter message after the initial startup period. The central processing unit receiver, however, is not in synchronism with the remote station transmitters since they are all directly connected to the same return transmission line. Thus, all of the remote station transmitters must be turned off until a polled station is transmitting. Otherwise, the return carriers from the several stations could overlap.

This means that the central processing unit receiver should have a fast sync capability as the central processing unit receiver must be in synchronism with the remote station transmitter's data stream before it can obtain messages.

The disadvantages of the direct system are that all the remote station transmitters must be off, thereby creating the synchronization problem with the central processing unit receiver which should have a fast sync capability. This is because the simultaneous transmission of carriers from two transmitters would result in erroneous message reception. Also, the remote stations cannot initiate transmission. The advantage of the direct system is that a failure at a remote terminal would not result in a system failure because the parallel arrangement creates a separate loop for each remote station.

In the hub-polling method, a variation of the direct method, the remote station transmitter-receiver pairs are connected in parallel with the central processing unit. However, there is an additional receiver associated with each remote station transmitter. There is only one polling transmission from the central processing unit, which transmission will be "handed along" from the most remote station to the station next most remote. The output transmission from the central processing unit is received at a remote location which a first receiver which actuates a switch to activate a transmitter at the remote location. The poll is transmitted along the communications line to a receiver at another remote station which initiates retransmission of the poll by the transmitter at that station along the communications line and so on from remote station to remote station until the transmissions arrive back at the terminal processing unit. Since each remote station has two receivers, the second parallel is used to receive synchronization signals from the central processing unit to synchronize the transmitter and the other receiver at that station The hub system is subject to essentially the same disadvantages as is the direct system, namely, only one remote transmitter may be on at a time, thereby requiring a fast sync capability in the central processing unit receiver which adds to the system complexity and imposes the requirement of a fast sync pulse to minimize the time that the central processing unit receiver must wait to receive input communications. If the fast sync pulse is missed at the central processing unit receiver, the incoming message may be missed entirely. The hub system has the advantage that a failure at a remote terminal need not result in a system failure because of the alternate parallel path similar to the direct system. The additional advantage of the hub system lies in the ability to poll the remote station with one signal from the central processing unit rather than a plurality of signals as is required in direct system, thereby resulting in a saving of time in the reception of incoming messages. As in the direct system, communication in the hub system can only be initiated at the central processing unit.

In an embodiment of the present invention, a round-robin-type polling system used a series transmission loop in which transmitter-receiver pairs at each remote station are linked in a common communications loop to the central processing unit whereby messages are transmitted from the central processing unit transmitter and received at a receiver at a remote location which in turn activates a transmitter at that location to transmit the poll and any messages from that station serially along the communications loop to a receiver at the next remote station which activates a transmitter at that station to transmit the poll along with the messages from the previous station and messages from that station along the line to the next station and so on until the total of messages sent from all the remote stations is received back at the central processing unit receiver. In the round-robin system, each section of the communications loop comprising the transmitter at one location and the receiver at the next location is synchronous with itself. Thus, no startup time is necessary after the initial system turn on; and whenever a location is ready to send a message the line is ready to accept it. Of course, since the entire communications loop is made up of a plurality of synchronous portions, no fast synchronization pulse is necessary. This invention provides for preventing overlapping of messages present on the transmission line which might occur under conditions of heavy traffic.

The demand access polling method of the present invention is a variation of the round robin method in which the abovementioned disadvantages are eliminated by the provision of a flexible system in which transmission is initiated from the remote stations rather than from the central processing unit. A capability at each remote location to "look back" along the transmission line for a fixed amount of time is provided in one embodiment so that transmission of a Request to Send information occurs only when that portion of the line looked back upon is known to be clear. This Request To Send message, when received back at the central processing unit, allows the central computer to allocate transmission time in accordance with its programming only to those stations which have information to send and only in a sequence in which overlapping is prevented.

In an alternative embodiment, the Request To Send messages from the various displays are readied for transmission during programmed interrupts in the system program, and are transmitted when the line is clear. In the event that the line is not clear when a Request To Send is in the process of transmission, only that portion of the message on a clear line is transmitted, with the rest inhibited until the line is again clear. This process is repeated until a complete Request To Send message is transmitted.

Other features and advantages of the invention will be seen as the following description of particular embodiments thereof progresses, in conjunction with the drawings.

DESCRIPTION OF THE PREFERRED EMBODIMENTS

Figure 1:
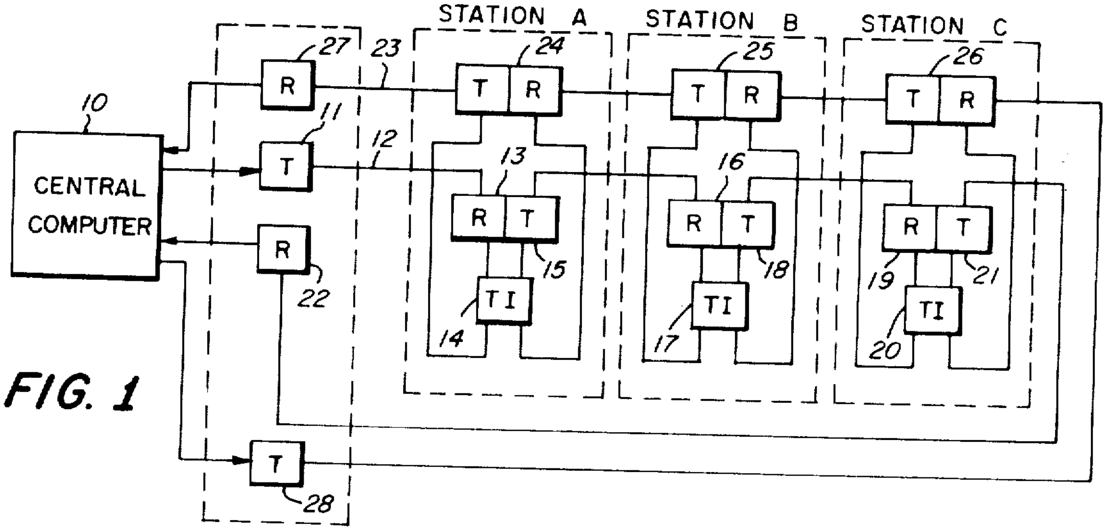
FIG. 1 shows a self-polling system in which the present invention may be employed wherein protection against line faults provided.

FIG. 1 is illustrative of a self-polling communications system of the present invention in which dual-transmission lines are provided as protection against failure at any of the remote stations so that a failure at any one station will not destroy communications in the loop as a whole. Three remote stations, stations A, B and C, each of which is advantageously located in a different city, are shown in FIG. 1 serially linked to the central processing unit 10 which contains a computer in which all of the data which must be accessed by the remote stations is stored. A signal is transmitted by transmitter 11 associated with central processing unit 10 along the main communications line 12 to a receiver 13 at station A which is synchronized with transmitter 11. Access requests to the computer in the central processing unit are stored in a terminal interchange 14 and transmitted by transmitter 15 along line 12 to the next station, station B; when receiver 13 by receiving the interrogating signal causes the terminal interchange and transmitter at the location station to pass on both the interrogating signal and any stored messages. The interrogating signal is delayed a fixed number of bits in a shift register in the terminal interchange in this embodiment before being passed along to station B to permit insertion of Demand Access as will be more fully explained with reference to FIG. 7.

In the alternative embodiment, the system permits total control over message transmission to and from the local station, to be exercised, without a delay in the local station, by means of the central computer 10. For example, station B a receiver 16 receives the interrogating signal and any messages from transmitter 15 at station A, and in addition forms a synchronous subloop with transmitter 15. Terminal interchange 17 passes any stored messages to transmitter 18 which in turn relays the total messages and polls to receiver 19 at station C and associated terminal interchange 20 and transmitter 21 and so on back to receiver 22 of the central processing unit. Thus, each transmitter at each location station relays all messages and requests for access to the central computer generated at that station and all more upstream stations along the line to the next most downstream station. In the event, for example, that only station B had a message to send to the central computer, a demand access request would be inserted into the signal train at station B, whereupon the signal train would be passed to station C and then back to the central computer.

The central computer controls the traffic on the line once future traffic conditions are made known by the receipt of Demand Access requests from the remote stations. A Clear to Send message is transmitted from transmitter 11 with a header addressed to station B, which message is received by receiver 13 at station A, retransmitted by transmitter 15 at station A, received by receiver 16 at station B and sent to terminal interchange 17 at which point the Clear To Send message initiates the transmission of the message, which permission to send was requested. In the event that station C has a Demand Access request, it also must be sent during the predetermined fixed delay period and cannot be sent when either any part of the message originated at station B is present in that delay or when any other Demand Access request or message from any other station is present in the fixed delay period. Thus, overlapping of messages and requests to send messages is prevented.

An additional path 23 is provided between the central processing unit 10 and the remote stations in the event of a failure at any of the remote stations. Transmitter-receiver pairs 24, 25 and 26 in stations A, B and C, respectively, provide this additional path between receiver 27 and transmitter 28 at the central processing unit. Thus, should a failure occur, for example, in the terminal interchange 17 of station B, messages from terminal interchange 14 of station A would be routed through transmitter-receiver pair 24 along line 23 to receiver 27 and messages stored in terminal interchange 20 would be routed through transmitter 21 to receiver 22 while the interrogating signal, hereinafter called a "poll," from the central processing unit would be transmitted via transmitter 11 along line 12 to receiver 13 at station and via transmitter 28 along line 23 and transmitter-receiver pair 26 to the terminal interchange of station C.

Figure 2:
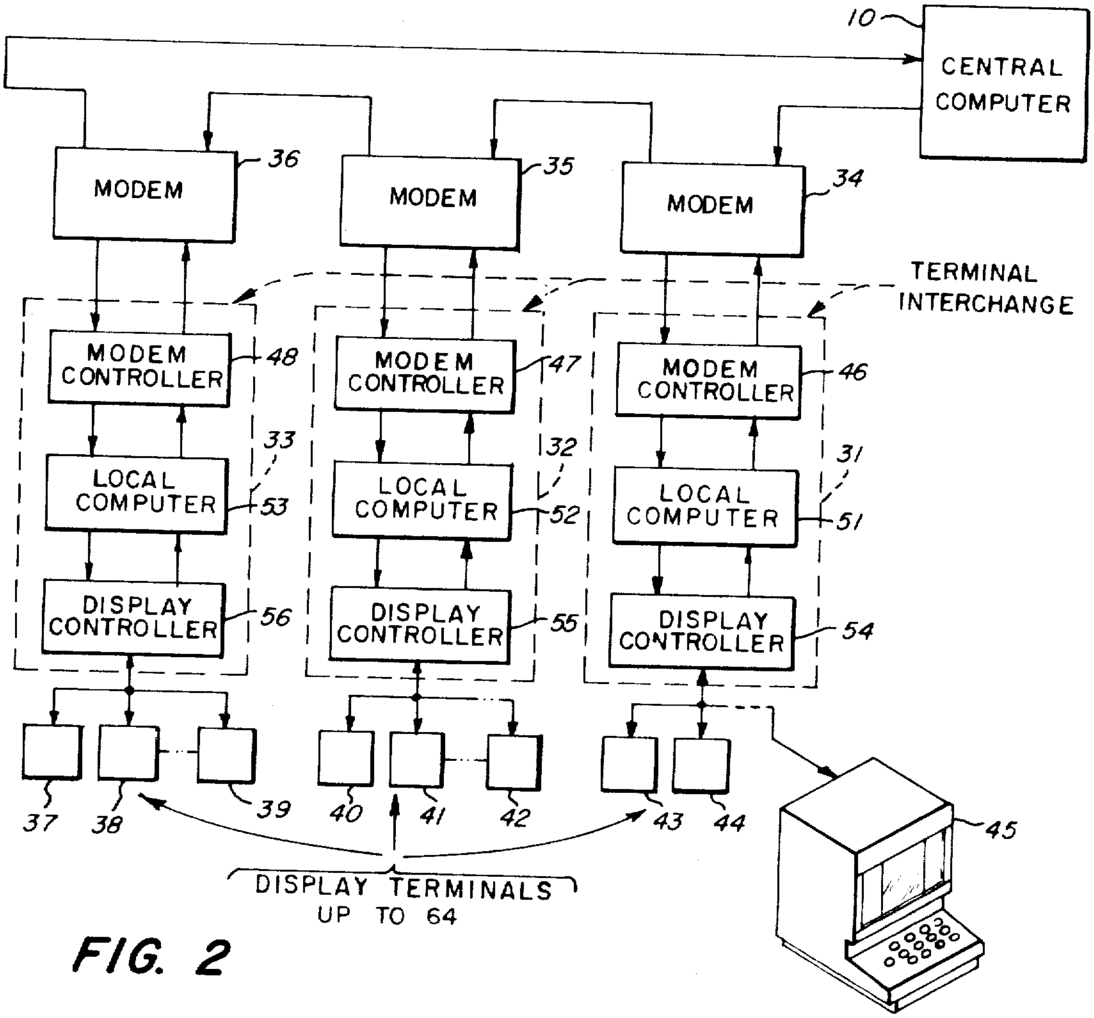
FIG. 2 shows a digital-communication system embodying the present invention.

Referring now to FIG. 2 there is illustrated an embodiment of the invention in which data and system commands are controlled by the system software to regulate data traffic and prevent message overlap. A plurality of terminal interchanges 31, 32 and 33 are shown, each of which may, in an airline reservation system, for example, be located in a different city. The function of each terminal interchange is to control the data flow from the central computer 10 and to the central computer either directly or through other terminal interchanges. The messages, both data and control are modulated on the carrier present in the connecting telephone lines in modems or modulator-demodulator pairs such as Western-Electric-type 20IBW2 data set, or Milgo modems, and are shown in block form as elements 34, 35 and 36 associated with terminal interchanges 31, 32 and 33 respectively.

The normal data flow sequence is initiated by the transmission of a message from a terminal display, shown representatively as 37 through 45, however, up to 64 CRT terminal displays may be controlled by the display controller, to be described, of a terminal interchange. The central computer receives the transmitted message, which may be a request for data, and responds with a message indicating whether the line is clear to transmit, which message may or may not pass through other terminal interchanges in transit.

The modem controllers 46, 47 and 48 of terminal interchanges 31, 32 and 33 respectively permit duplex communications between the local computers 51, 52 and 53 of the terminal interchange which may comprise a Honeywell 416, respectively and the 2,400 baud full duplex modems 34, 35 and 36 respectively. While only one modem controller per terminal interchange is illustrated, each interchange is capable of having as many as four.

The local computers 51, 52, and 53 are interfaced to the display terminals by display controllers 54, 55 and 56, which may also interface printers; however, CRT terminal displays such as the display disclosed in the copending application, to Joseph E. Bryden, Ser. No. 19,371 are utilized in the embodiment described. Functionally, the display controllers coordinate the message transfer between the terminal displays and the local computer by multiplexing the individual display messages and enabling high-speed data transfer to and from the displays.

Figure 3:
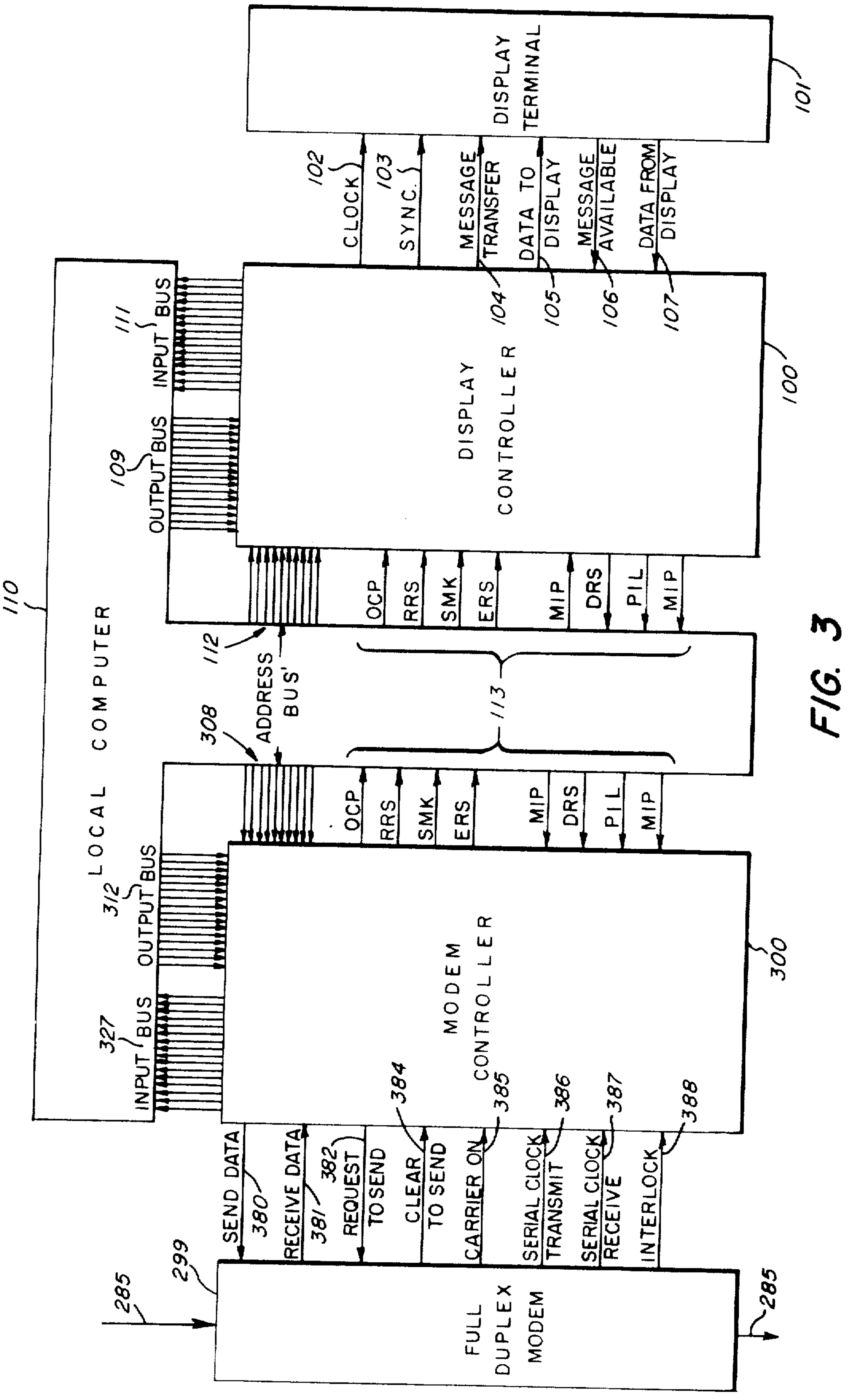
FIG. 3 shows a local station terminal embodying the present invention.
Figure 4:
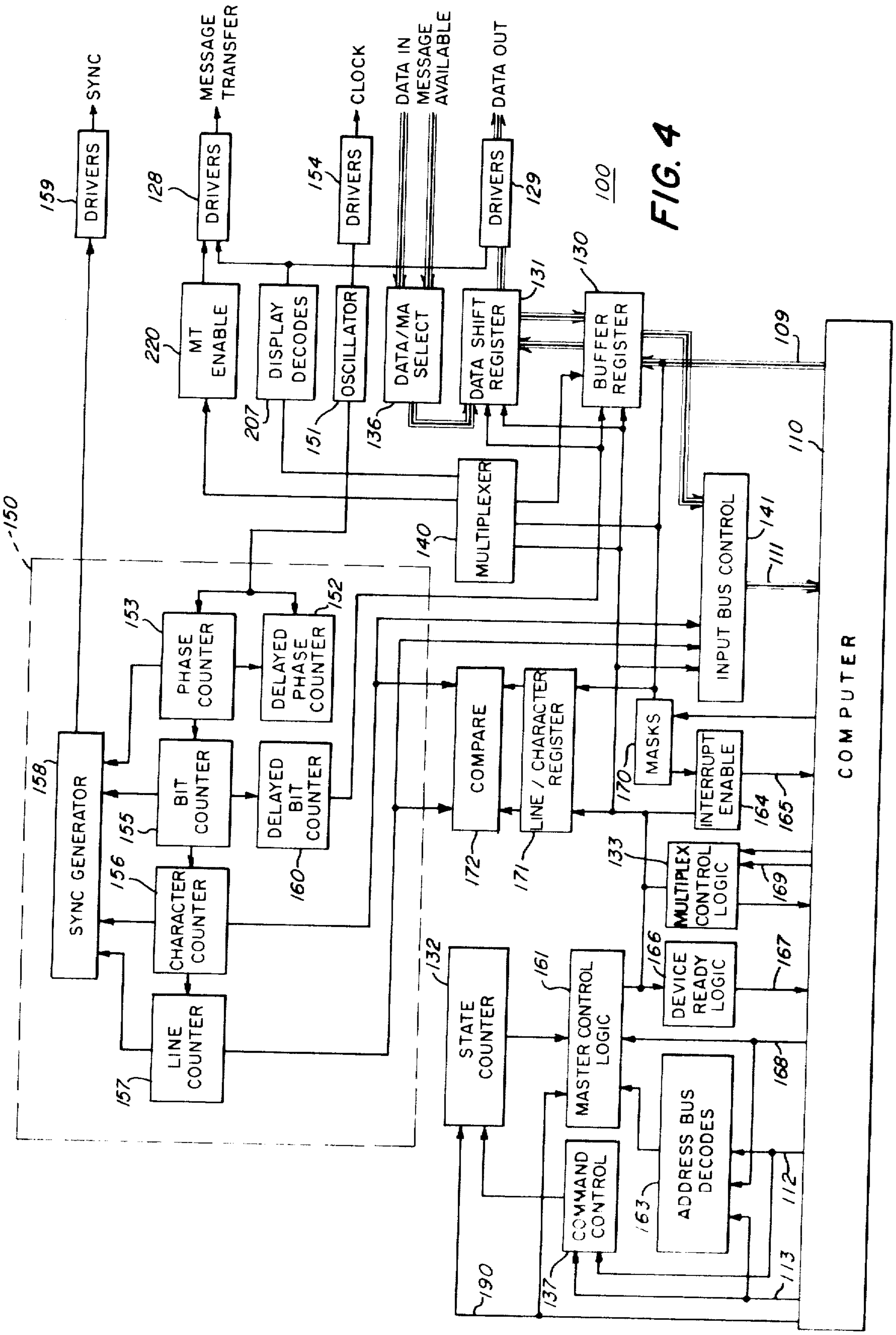
FIG. 4 shows a display controller of the present invention.

Referring now to FIGS. 3 and 4, the display controller portion of the terminal interchange is shown functionally and in block form. The display controller interfaces the display terminals at the remote stations with the local processor computer in the terminal interchange. In the present embodiment, up to 64 cathode-ray tube display terminals may be interfaced by the display controller.

Figure 5:
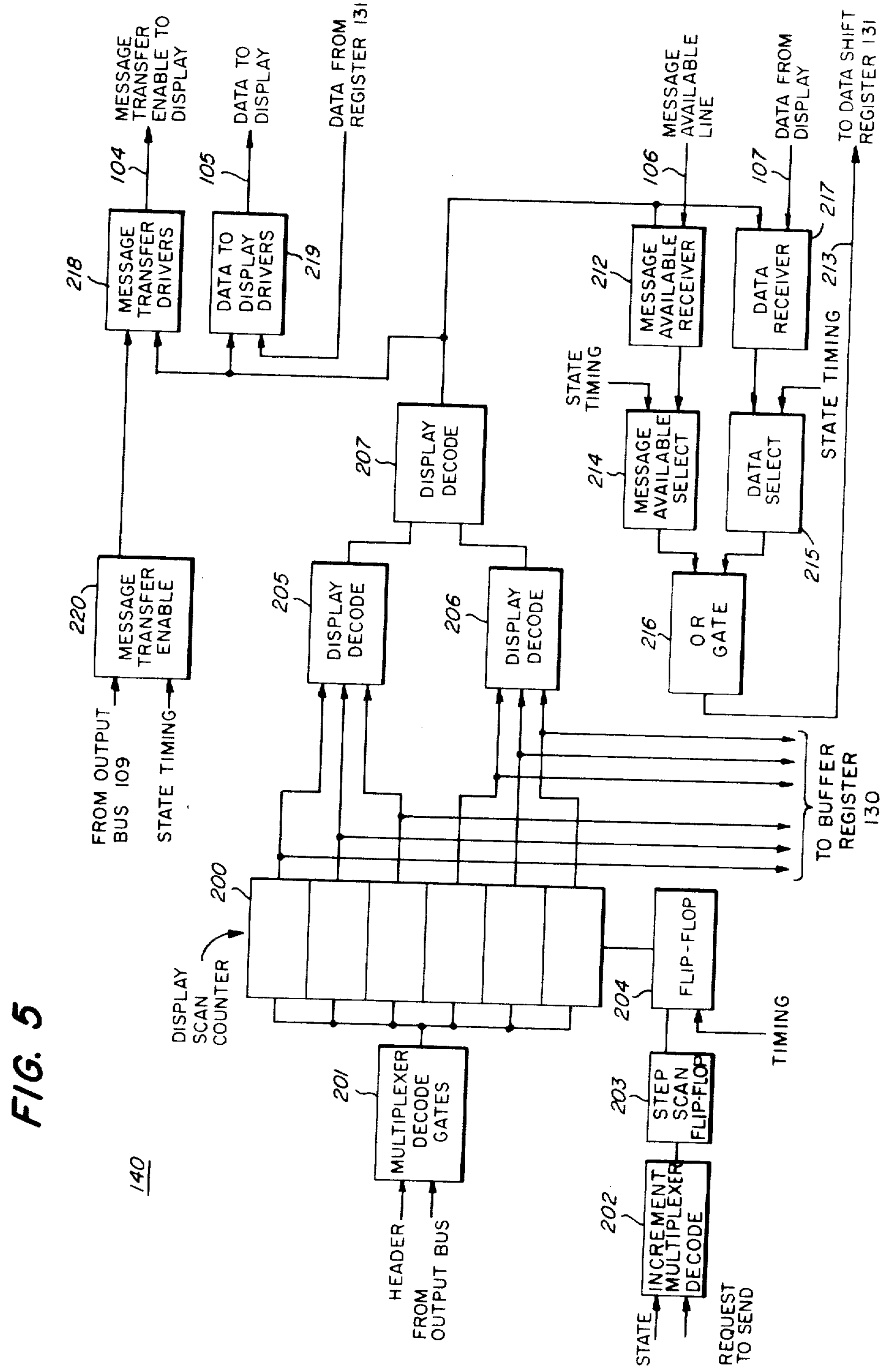
FIG. 5 shows a direct control multiplexer of the present invention.

Functionally, the display controller shown generally at 100 selects one of up to 64 terminal displays for communicating with the central processing unit via a direct-multiplexing control channel, described with reference to FIG. 5, which enables high-spped data transfer between the central computer 10 and the display terminal and produces clock and syncronization signals which are used by the connected terminal display devices such as display terminal 101 for internal timing.

Data pertaining to airline reservations or other flight information is developed in the display terminal 101 by display terminal operators. When this data is ready for transfer, the display controller detects the data and reads it into the core memory of the terminal interchange computer 110.

Data is transferred between the display controller and each display terminal via control lines 102 through 107. Line 102 couples symmetrical clock pulses from display controller 100 and terminal display 101. These clock pulses occur at 1.1667 MHz. and are generated in internal timing circuits, as will be explained with reference to FIG. 4. Functionally, the 1.1667-MHz. clock synchronizes the timing of the terminal display with that of the display controller. Line 103 couples the synchronization signals developed by a synchronization generator circuit 158 shown in FIG. 4, which are used to develop scan timing pulses for controlling the display size. Line 104, the message transfer line, is used to key the display terminal once each character time when a message is to be stored by the dynamic delay of the display terminal. The operation of the dynamic delay line described is in the before mentioned copending application to Joseph E. Bryden. Data is coupled to the display terminals in serial bit form via line 105 at the 1.1667-MHz. clock rate and from the display terminal to the display controller via line 107, also in bit form. Line 106, the Message Available line, couples a signal to the display controller when a message is available for transfer from the terminal display to the display controller in response to the depression of a key on the display keyboard by the operator. The keyboard may be of the type disclosed in the aforementioned copending application to Richard F. Heimann.

Character address code information is coupled in parallel from a 16-bit shift register in the local computer 110, two characters at a time, to a buffer register in the display controller prior to transfer via line 105 to the display terminal 101 over the output bus, consisting of 16 output-data lines shown at 109. An input bus line also consisting of 16 data lines shown at 111 couples data, two characters at a time, from the display controller to the local computer 110.

The display controller address bus indicated generally at 112 consists of 10 lines which couple commands from computer 110 to the display controller in a 10-bit format in which the four least significant bits appearing on four of the address bus lines are used for coding the particular command to be performed and the six most significant bits appearing on the other six address bus lines are used for controller addressing. A specific controller address accompanies each command as a header. Therefore, only the controller addressed decodes and responds to the command. The commands may vary in accordance with specific system requests. However, in the present system there are four general types—Operational Commands, Computer Register Input Commands, Sense Status Commands, and Set Mask Commands; which will be explained with reference to FIG. 4.

Nine additional lines indicated generally at 113 couple various control signals to and from the display controller in accordance with the system program. Functionally, these lines perform the following operations:

Output control pulses (OCP) from the processor to the controller cause the controller to enter into specific modes of operation and are coupled over the OCP line to the display controller. One of the modes of operation initiated by these operational commands is the Autopoll Mode in which the display controller examines the Message Available line 106 of each display terminal for an active message available. When such a signal is detected, an interrupt is sent to computer 110 to allow transmission of the message which is a Request To Send, or demand for access to the transmission line. Other operational commands which initiate other modes of operation in accordance with the system program include Read, in which messages detected during Autopoll are read into the computer on line 107; Write, in which data is transferred over line 105 to the display; Interrupt, which occurs during the Read, Write and Autopoll modes; and Reset, which controls the duration of the Interrupt. The Interrupt occurs once every 15 milliseconds for a bit time duration which is long enough to allow Requests To Send to be transmitted without overlap of other bit time sequences from other local computers which are connected in series to the central processing unit computer 10. since the local computers and the central computer programs provide for this Interrupt every 15 milliseconds, no data is transmitted during this time other than Requests To Send although such messages may of course be sent at other times in accordance with the system programming. Thus, access to the system may be demanded by remote terminals without the danger of overlap of either data or other Requests To Send, for only one Request To Send may be present in any one Interrupt period in accordance with the system program.

Computer Register Input Commands, which allow the parallel transfer of data to the computer via the input bus 111, produce Data Ready Signal (DRS) which informs the computer that information is ready for transfer and is shown as line DRS. When this signal is sensed by the computer program, the data is inputted to the storage register of the computer and after the transfer is complete, another signal DA is generated to inform the display controller that the data has been accepted.

The Program Interrupt Line (PIL) couples the program interrupt command to the computer when an interrupt condition is detected by the controller and the processor enters the appropriate interrupt subroutine to determine which controller issued the Interrupt which involves placing a Sense Status Command on the address bus 112 until the controller that issued the Interrupt is detected. The Set Mask Commands (SMK) permit the processor to selectively mask or inhibit Interrupt conditions from the various display terminals until the particular Interrupt sought is located. The control pulses for this command occur on the SMK line.

The priority of the Interrupt conditions received is governed by the direct multiplex control which will be explained with reference to FIG. 5, which information transfer occurs over the Multiplex Interrupt Priority lines (MIP). When too much data for a particular memory block is transmitted, an End of Range Signal (ERS) is sent to the controller via line 169 to inhibit further data transfer by inhibiting all further requests on the MIP line. Other lines coupling other commands such as a source of clear pulses 190 to and from the display controller may be added as system requirements vary.

Referring now to FIG. 4, the display controller 100 may be divided by function into three major areas: data transfer circuits, timing circuits, and control circuits. Throughout FIG. 4, the heavy lines represent data flow.

The data transfer circuits comprise buffer register 130 and data shift register 131. The purpose of the data transfer circuits is to provide efficient half-duplex data transfers between the core memory of computer 110 and the connected terminal device, in this case a CRT display terminal. Once a transfer command is issued and transfer begins, control is switched to an internal state counter and direct multiplex logic control circuits 133, the operation of which will be explained, to allow operation to continue without further instruction from the computer. These circuits regulate data transfers between the terminal display and the computer until an End of Range Signal (ERS) is generated terminating data transfer and resetting shift register 131 until the next instruction is received.

Buffer register 130 is a two-character temporary storage register comprising 16 flip-flops that interfaces the display controller with the computer over input and output buses 111 and 109, respectively. Functionally, in the writing mode,, register 130 stores data transferred from computer 110 via lines 109, two characters (16 bits) at a time, until the previous characters contained therein have been serially shifted to display 101 by shift register 131. In the reading mode, data transfers in from register 131 to buffer 130, two characters at a time, thereby emptying register 131 which enables the shifting of an additional two characters in from the display terminal. This gives the computer approximately 48 microseconds to accept data from register 130 before data is lost.

When a Request To Send is present in the Autopoll mode, register 130 receives terminal display address information from multiplexer 140 which is stored until the computer requests the information by means of a Read Poll Data Command which transfers the device address data from the buffer register to the computer through the input bus control circuitry 141 to be described.

Data shift register 131 is a 14 -bit register consisting of 16 flip-flops which the write mode transfers data, two characters at a time, from the buffer register to a character entry shift register in the display terminal of the type described in copending application to Joseph E. Bryden.

In the read mode, data is serially shifted into register 131 from a select circuit 136 which selects either data or Requests To Send from the display terminal in accordance with the message header present, with the control character transfer occurring upon the receipt of an enabling signal from state counter 132.

In the Autopoll mode, the character transfer is enabled during the message search sequence and if a Request To Send is present it is decoded in a message available decoder responsive to the state counter 132 to enable an interrupt to the computer for processing the Request To Send without overlapping other data or Requests To Send from other terminal displays.

The display control timing circuits 150 generates syncronization and clock pulses which control the internal controller timing and synchronization for the connected display terminals. The timing is divided into undelayed and delayed timing, with the delayed timing being delayed approximately at 1.34 milliseconds with respect to the undelayed timing.

The undelayed timing is used both internally and externally to control data transfer throughout the system, internally as an accurate clock for enabling specific controller operation at the correct time and externally to synchronize the terminal displays to the controller time base. Additionally, the interrupt produced once every 15 milliseconds enables the local computer operations to coincide with the timing of the display controller and the connected display terminals.

A master oscillator 151 generates a 1.1667 MHz. clock frequency which is supplied to the delayed and undelayed phase counters 152 and 153, respectively, and through suitable drivers 154, which are of conventional design as are driver 128 and 129 associated with the message transfer enable circuitry and select circuit 136 respectively, to the terminal displays. Phase counter 153 of the undelayed timing is a divide-by-4 counter in which the set and reset of each counter flip-flop are interconnected to six decode gates (not shown) to produce 6 phases of the master clock 151. The delayed timing is delayed by three phase times, each phase time being 0.427 microseconds. Phase counter 153 drives a bit counter 155 and divides each bit into four parts, which will be called phases A, B, C and D (0A, 0B, 0C and 0D). Phase A pulses are used to time operations occurring at the beginning of a bit time while phase D pulses occur as the last phase of each bit.

Bit counter 155 is a divide by 7 counter which generates 7 bit times, during which times the various system data and control operations occur. Since each character address contains six bits plus an intercharacter bit, counter 155 determines the individual address code timing.

In the present embodiment, 48 characters per line are developed; therefore, character counter 156 is a divide-by-48 counter which counts the number of characters in each horizontal line of the display terminal. Six of the 48 slots are used for horizontal retrace. The character counter is clocked by each third bit output of bit counter 155, thereby advancing the display controller character count 4 bits with respect to the count in the terminal displays which enables the display controller to perform logical operation before the 7 bit time occurs, at which time state transitions and parallel data transfer occur.

At the end of each horizontal line, a reset counter (not shown) for character counter 156 toggles a line counter 157, which is a divide by 13 counter (corresponding to the thirteen lines). Thus, the controller counts the number of horizontal lines. The output of the line counter is used to develop the composite synchronization signal in synchronization generator 158, which comprises a flip-flop and associated input-gating circuitry, and which supplies to the attached terminal displays the horizontal and vertical retrace and a real-time clock interrupt once every 15 microseconds. The composite synchronization signal is coupled by driver 159 to the display terminals.

Delayed timing is provided by delayed phase counter 152 and delayed bit counter 160 to permit synchronization between the internal operation of the display controller and delayed data from the display terminals. In the present embodiment, the delay produced is approximately 1.72 microseconds, which corresponds to the delay which is introduced when a display terminal is connected to the display controller by 300 feet of cable; therefore, data cannot be lost when the separation is less than 300 feet. Of course, the delay and display separation is variable. Operationally, delayed phase counter 152 and delayed bit counter 160 perform the same function as do their undelayed counterparts 153 and 155 described above.

The third major portion of the display controller, the control circuits, permit the local computer 110 to communicate directly with any one of 64 terminal displays connected to the controller 100 by decoding and interpreting computer commands coupled to the display controller over the address bus lines 112.

As previously mentioned, state counter 132 operates after commands are received from the local computer. The state counter is a multistate control device comprising four control flip-flops which operate independently of one another but share common input-output and clock circuits. The state counter can assume any one of 15 states representative of the number formed by each flip-flop's output, for example, binary 1111 if all control flip-flops are set. The state counter output is monitored by output function decodes and state transition decodes (not shown) present in the master control logic circuitry 161. The output function decodes initiate the various circuit operations within the display controller whenever the state counter enters the desired state and some external input condition received from the command control 137 is satisfied in accordance with the system program. For example, when the state counter enters state 0011 simultaneous with the receipt of an Autopoll signal, two output circuit functions must be shifted into data shift register 131. To enable this shift, clock pulses from the delay-bit counter 160 are applied to the register when a specific output function decode condition is satisfied. After shifting the Message Available line level into the register (which level may contain a Request To Send, or "demand access" request), a "NOT" Message Available condition enables a second output function decode to increment multiplexer 140 to the next display terminal slot. The various output function decodes are described by way of example only since the particular function to be performed is dependent upon the program.

State transition decodes (not shown) step the state counter from one state to another after all the output functions of the first state have been accomplished. State transitions occur at the end of each character time after the previous state has existed for a full character time under the control of a clock (not shown) in order to assure that one complete character can be shifted in from a display terminal before a state transition is initiated.

The address bus line 112 and the operations command line 113 are monitored by decodes 163 in order to produce low-level pulses to flip the state counter to a specific state.

In accordance with the system program, multiplexer 140 is controlled by the state counter to provide the required selective addressing of the terminal displays for coupling demand access requests and data transfer without overlap to the modem controller 300 for transmittal to the central processing unit.

Multiplexer 140 is shown in greater detail in FIG. 5 and operates as follows: A display scan counter 200 comprising six flip-flops acts as a 64-digit counter responsive to a coded input from computer 110 which is decoded in multiplexer decode gates 201 and which is used to enable each of the display terminals. In the Autopoll mode, the scan counter is incremented by one count each time the terminal display currently addressed does not have a Request To Send, and the next terminal display is addressed. Increment multiplexer decode gate 202 senses the presence or absence of a Request To Send during the appropriate state counter state and supplies an output to a step scan flip-flop 203 which drives flip-flop 204, which flip-flop also receives a timing signal from the timing circuitry, thereby clocking the output of flip-flop 203 at a set rate to increment scan counter 200. The specific count of scan counter 200 is decoded by display decodes 205, 206 and 207 to enable the 64 Message Available lines shown symbolically at 106, the message transfer lines shown symbolically at 104, the 64 lines coupling data to the terminal displays shown symbolically at 105, and the 64 lines coupling data from the displays to the multiplexer shown symbolically at 107.

Display decodes 205 and 206 consist of 16 AND-gates which receive their inputs from the display scan counter flip-flops. Decode gates 205 decode the eight possible states that the three least significant bit flip-flops can assume while decode gates 206 decode the eight possible states that the three most significant bit flip-flops can assume.

Display decode gates 207 consist of 64 AND-gates which receive their inputs from decode gates 205 and 206 for enabling the selection of the appropriate terminal address. As previously mentioned, the terminal displays relay Requests To Send and other Message Available signals to the display controller on lines 106 to 64 signal receivers 212. Display data is received on lines 107 at receiver 217 where it feeds the data-select circuit 215. In the Autopoll mode, Message Available line 213 is enabled by select decode gates 214 and 215 which pass the Request To Send signal through OR-gate 216 to the data shift register 131 wherein the signal is decoded and the appropriate display address from the scan counter 200 is entered into buffer register 130 for transfer to computer 110 through input bus control circuitry shown generally at 141 which includes 16 drivers of conventional design (not shown). In the WRITE mode, the display diode output enables message and data transfer via lines 104 and 105 to the displays from drivers 218 and 219 respectively. If the most significant bit (MSB) of data shifted into the buffer register 130 is a logical one, message transfer enable circuit 220 will inhibit driver 218 during that time so that when the character is serially shifted through the driver from the data shift register 131, the character will be inhibited from entering the display delay line memory. Of course, under logical-zero condition, no inhibit will occur.

Except for Operational Commands controlling the state counter and Set Mask Commands initiating program interrupts on line 162, all computer commands are decoded in the address bus decodes 163 before they are acted upon by the display controller. Each command on the address bus contains an appropriate header so that only the proper controller acts upon the command, in this case the display controller unit rather than either the transmitting or receiving portion of the modem controller.

The address bus decodes 163 decode Operational Commands Output Commands to the computer, Input Commands for the computer and Sense Status Commands (SKS) which sense the status or condition of a terminal.

The output of buffer register 130 is gated over the input buss line 111 to the computer by the input bus control circuit 141 which comprises 16 AND-OR-gates, each of which is connected to a line driver (not shown). The purpose of the input bus control 141 is to enable several controllers to give data to the computer without overlap.

In accordance with the system program, data is transferred from the input bus control to the computer under any one of the following conditions: two data characters have read from a display terminal and are waiting transfer to the computer, or a detected Request To Send signal has caused the address of the display terminal from which the signal originated to be loaded into buffer register 130 from the multiplexer 140.

The direct multiplex control (DMC) logic 133 enables data transfer between the display controller and the computer by causing a short duration (3.84 microseconds) interrupt in the program, during which time signals on line 162 enable two characters to be parallel transferred between buffer register 130 and the computer. After each two-character transfer,the computer returns to program control and proceeds with the next sequential instruction until another program interrupt is received. As with all other logic circuits in the display controller, the initial operation is caused by an Operational Command from the processor program. However, after initialization the state counter governs circuit operation. When a Request To Send is detected, the processor is interrupted and the terminal address is transferred to the processor. After being interrupted, the processor has one of two options. If the message queue is not completely filled, the processor directs the display controller to read the available message into the processor memory. If the queue is filled, the terminal address code is recorded and entered at some later time. Assuming that the former condition exists, seven logical ones are shifted into register 131 enabling a message available decode (not shown) which clocks the current terminal address into buffer register 130 and enabling another decode which steps the state counter to the next state transition. When the state counter enters this next transition, an interrupt is issued by means of the master control logic 161 causing the interrupt enable circuit 164 to raise the program interrupt (PIL) line 165. This interrupt condition notifies the computer that one of the controls requires attention, and the processor enters an interrupt sub routine to determine which controller (modem or display) issued the interrupt and for what reason.

When the computer finds that the display controller has discovered an active Request To Send, it issues a Read Poll Data command which is decoded by the address bus and function decodes 163, which decodes enable the device ready logic 166 through master control 161 160 to raise the device ready (DRS) line 167 to signal the availability of the Request To Send signal while simultaneously the address bus decode output places the address code from buffer 130 onto the input buss 111. In response to the raised line 167, an additional command is issued on line 168, the RRS signal as previously described which resets the state counter. The reading and writing modes of operation and the various state counter transitions associated therewith are determined by the overall system program and are not described here.

The master control logic 161 includes the interrupt mask flip-flop 170 for enabling or disabling all display control interrupt conditions except for the cyclic real-time clock interrupt. When the line character count of the undelayed timing corresponds to a processor generated code in comparing circuit 172 held in the line character register 171, an interrupt is caused to allow the processor to read or write data beginning at a specific line character position on the display controller CRT screen. This interrupt has no effect on the real-time clock interrupt occurring every 15 milliseconds enabling message synchronization between the display controller and the display terminals.

Figure 6:
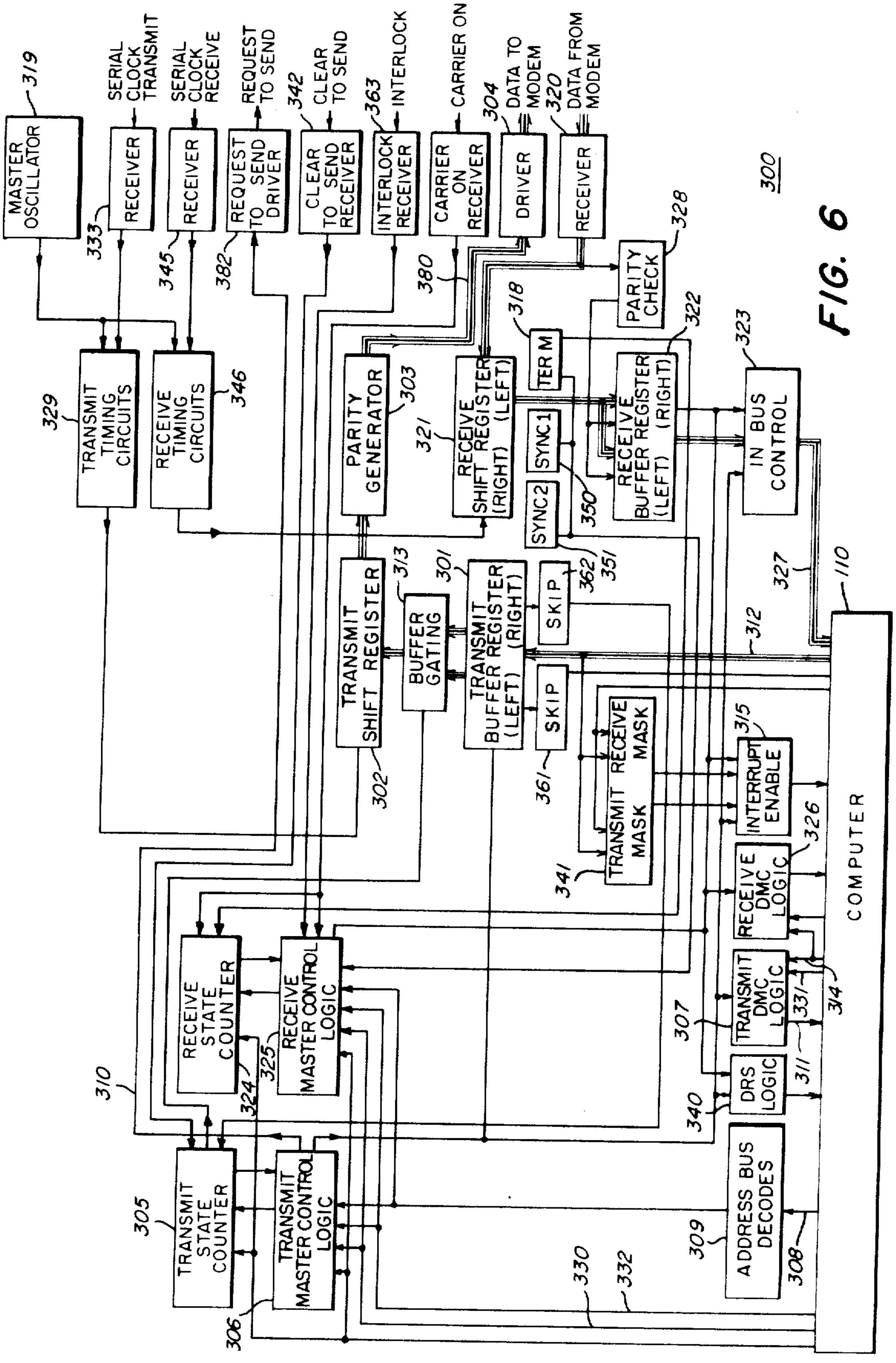
FIG. 6 shows a modem controller of the present invention.

The modem controller portion of the terminal interchange shown functionally in FIG. 3 and in block form in FIG. 6 in which the heavy lines indicate data flow interfaces the local station computer in the terminal interchange with the communication modem 299 of the 2,400-baud full-duplex-type made by Western Electric. The modem controller comprises separate transmitting and receiving portions that communicate with the local computer on a priority basis.

When transmitting, the modem controller accepts parallel data from the computer 110 and serially shifts this data to the modem over the send data line 380 of FIG. 3 at a rate of 2,400 bits per second (3.33 ms. per character) for eight-bit characters. The receiving portion of the modem controller accepts serial data transfers on the receive data line 381 from the modem and then buffers the data, two characters at a time, into the core memory. The modem controller is always under the direct control of the local computer 110 and cannot transmit or receive data without being directed to do so. However, once the receive or transmit modem controllers begin to transfer data, no further commands are required from the computer.

Line 382 is used to couple the Request To Send signal from the terminal interchange to the central computer. In accordance with the system program, if data is present on a communication line when the Request To Send signal is to be transmitted, it is inhibited and a new Request To Send is sent during the next program interrupt in response to a Transmit Operation Command from the local computer 110. Since data is couple to the modem through the transmission line only in response to the directions from the local computer, there can be no overlapping of the Request To Send signal from one interchange with the data or Request To Send from the same interchange because of the direct multiplex control described with respect to FIG. 5 and with data or Requests To Send which may be present on the communications line because of the transmit inhibit present when the line is not clear. It is to be emphasized that no delaying of messages from the terminal interrupt is required with a programmed inhibit. Since transmission may or may not occur depending on line conditions, however, program interrupts occur often enough so that the Request To Send is transmitted before a Clear To Send signal is received on line 283. Of course, once a Clear To Send signal is received, a Request To Send and other data transfers may safely be made since the central processing unit program has allocated line time for these transfers.

Briefly, the Carrier On line 284 is used to inform the local processor that a carrier is present. Timing pulses are coupled from the central processing computer on transmission line 285 through the full duplex modem 299 to the modem controller on lines 286 and 287 to the transmitting and receiving portions of the modem controller, respectively. The interface lines 113 connecting the various computer commands to and from modem controller 300 couple control signals as illustrated and as described with reference to FIG. 3 in connection with its display controller operation.

The modem controller shown in block form in FIG. 6 is divided into transmitting and receiving sections, each operating independently of the other so as to achieve full duplex capability between the local computer and the central-processing computer. The modem controller has the capability to transmit digital data at 2,400-bits per second Buffers between the high speed internal data transfer circuitry and the relatively slow speed serial data transfer circuitry to and from the modem are provided, which enables uninterrupted data transfer from the local memory core to the full duplex modem.

Operationally, when the local computer 110 receives a polling directive from the central computer, a return data message is prepared for transmission. The data-handling circuits transfer these return messages from the computer 110 to the modem, and comprise buffer register 301, data shift register 302, parity generator 303, and modem data driver 304. The flow of data through these circuits is controlled by state counter 305, master control logic 306 and direct multiplex control logic 307 which will be explained. Data transmission is initiated at the local station by computer 110 with the generation of an operational command to "start transmitting" over the 10 Address Bus lines shown symbolically at 308. This command is decoded by the address bus decode 309 and causes a flip-flop in master control logic 306 to enable a state transition in state counter 305 which raises the logic level of the Request To Send line 382. While the transmitting master control logic 306 is waiting for the Clear To Send response, a direct multiplex control transfer channel is opened by means of another operational command from computer 110 via the address bus line 308 which establishes a request for data from the multiplex control logic 307 and is coupled to computer 110 via line 311, which when raised causes a short duration program break, thus permitting a transfer to occur.

When the Clear To Send replay is received from the modem, state counter 305 enables data transfers from the processor by alternately requesting and then transferring data held in the core memory.

During the program break, which is approximately 4 microseconds, two eight-bit data characters are coupled to buffer register 301 along the 16 output bus lines shown symbolically at 312. The state counter 305 then transfers these characters, one at a time, to shift register 302 via buffer-gating circuitry 313. Whenever a complete character is loaded into shift register 302, 8 slow-speed clock pulses serially transfer the character to the modem through parity generator 303 at 2,400 bits per second. When the data contained in the memory block is exhausted, a signal is coupled along line 314 to logic circuitry 307 which causes an interrupt enable circuit 315 to send a signal to the computer processor on the Program interrupt line (PIL) indicating the data exhaustion, whereupon data transfer is halted.

Skip characters decodes 361 and 362 detect skip characters in the left and right buffers 301 respectively, and do not transmit that character, but rather transmit the succeeding character. This would occur under error conditions.

Data from the modem is received on line 381 by receiver 320 where it is fed serially to a receiving data shift register 321 which is capable of holding 16 bits (two characters). This received data is transferred to the local computer via receiving buffer register 322 and input bus control 323 while under the control of state counter 324, master control logic 325, and the multiplex control logic circuitry 326 as will be explained. While a carrier is being received from the central processor, data is recognized only when the receive master control logic 325 receives an operational command on line 308 to "look" for a synchronization header, which may be, for example, two characters. Appropriate sync search flip-flops (not shown) are present in LOGIC 325, with sync detection and decode logic After the synchronization header is decoded, the state counter 324 is enabled, as will be explained. Following the synchronization header, the data characters are shifted into register 321 for transfer to buffer 322, the first character going left buffer and the second to the right buffer until register 322 contains two characters for transfer on the input bus line 327 to the load computer. Parity check circuit 328 checks the number of logical ones present in the received signal and generates a parity error signal to effect a program interrupt in the even of a parity error, in accordance with well-known practice.

Returning to the transmit portion of the modem controller, the parallel transfer of data on line 312 is controlled by the multiplex control 140, more fully described with reference to FIG. 5, and master control logic 306 while the serial data transfer from shift register 302 is controlled by the transmit timing circuits shown generally at 329. The state counter 305 and computer 110 act as overall system-controlling devices.

The transmitted portion of the modem controller is enabled when computer 110 issues the appropriate start commands on line 330, at which time the multiplexer is enabled, logic circuitry 306 "requests" data by raising line 311, and two characters (16 bits) are put on line 312 simultaneously with raised logic levels on lines 331 and 332 which clock the data into buffer register 301.

Characters are then transferred one at a time to shift register 302 under the control of the state counter 305 via buffer output gating 313 which selectively enables transfer from either left or right buffer. The modem timing circuitry 329 which receives clock pulses from a master oscillator 319 shifts the contents of register 302 one bit count for each serial clock transmit pulse from the modem at the transmit clock receiver 333. The shifted data cannot be transmitted until a Request To Send signal is present, since idle characters are present in the register 321 in accordance with the system software.

The Request To Send transmitter 382 and the modem data driver 304 are dual transistor switching circuits which level shift the internal logic levels of 0 and +5 volts DC to the modem logic levels of +12 and −12 volts DC for transmission.

The transmitting modem controller control circuits comprise the address bus decodes 309, state counter 305, master control logic 306, input bus control 323, data ready logic 340, interrupt enable 315, transmitting mask 341, and direct multiplex control logic 307.

Briefly, the address bus decodes 309 monitor the address bus to determine the particular command issuing from computer 110; state counter 305 enables the modem controller to cycle through a series of steps to sequentially perform the operation associated with operational commands; master control logic 307 "remembers" circuit conditions and either informs the computer or interrupts the program, the input bus control 323 permits selective gating of data to the computer, data ready logic 340 prepares the computer for receipt of data, the interrupt enable and masks permit selective inhibiting of processor interrupts; and the DMC logic 307 enables data transfers between the transmitting modem control circuitry and the computer under control of the multiplexer 140.

The transmitting state counter 305 is structurally similar to the display controller state counter 132 except that it has 11 assumable states, the status of which is monitored by output function decodes and state transition decodes which upon decoding specific state counter states in coincidence with other circuit logical conditions produces the required logical outputs.

State counter 305 has five general operating modes which are Reset, Request To Send and Clear To Send, Wait, Data Transmission, and Stop Transmission, of which the Request To Send and Clear To Send mode will be described.

Consider A, B and C and back to A as states of the transmitting state counter 305, each of which is a different combination of the outputs of the flip-flops comprising the state counter. The purpose of this loop is to maintain a transfer of idle characters, which are characters which do not affect the program of the central processing unit. This transmission is maintained until the modem controller receives a Clear To Send signal thereby preventing any gap in the transmission of information to the modem. The state counter enters the Request To Send/Clear To Send mode when the local processor issues a start transmit command which enables the state A to state B transition. In state B, an output signal is produced which is fed to buffer register 301 to enable transfer of the first character from that register. Also during state B, a Request To Send register which stores the Request To Send signal which in a group of logical "ones," in the master control logic 306 is clocked to enable the Request To Send line 310. After this transmission request is issued, the modem responds with a Clear To Send on line 283 received from the central processing unit at clear to send receiver 342. During this interval the state counter cycles through states A to B to C and back to A, placing idle characters on the send data line 380. In state A, the first bit of the idle character is placed on the send data line before the A to B transition is enabled while after the transition the remaining bits of the idle character are shifted to the modem. When a Clear To Send signal is received, the B to C transition is enabled, data transmission occurs and the Request To Send register is reset.

The master control logic 307 comprises a series of registers connected to receive and transmit various logic signals in accordance with the system program.

The receiving modem controller is nearly identical to the transmitting modem controller as may be seen from FIG. 6; however, the system program controls the receiving modem logic circuitry so as to perform the necessary data and operational receiving function. The serial data transfer into register 321 from data receiver 320 is a function of the serial clock received at receiver 345 which controls the receive timing circuitry 346 to provide message synchronization with the central computer 10. After message sync is established, characters are transferred at 2,400 baud (3.33 ms./character) to buffer register 322 under the control of receiving master control logic 325 and receiving state counter 324, which initiate the necessary logic sequencing in a fashion similar to state counter 305 and master control logic 306 of the transmitting portion of the modem controller. While serial data transfers are enabled once the central computer begins transmission, the receiving modem controller must first receive an operational command on line 330 from the local computer before data is recognized. When synchronization characters are present in register 321, sync decodes 350 and 351 generate an output which causes a state transition to occur which in turn causes the character transfer from register 321 to buffer register 322. The program interrupts necessary to transfer data from register 322 to computer 310 are enabled by the receive direct multiplex logic 353 in a manner similar to transmit interrupts by logic 307 which register 318 inputs message termination characters to the state counter 324 to terminate message reception.

Interlock receiver 363 couples a signal to both the receiving and transmitting modem controller sections from line 388 when power is applied to the modem.

Figure 7:
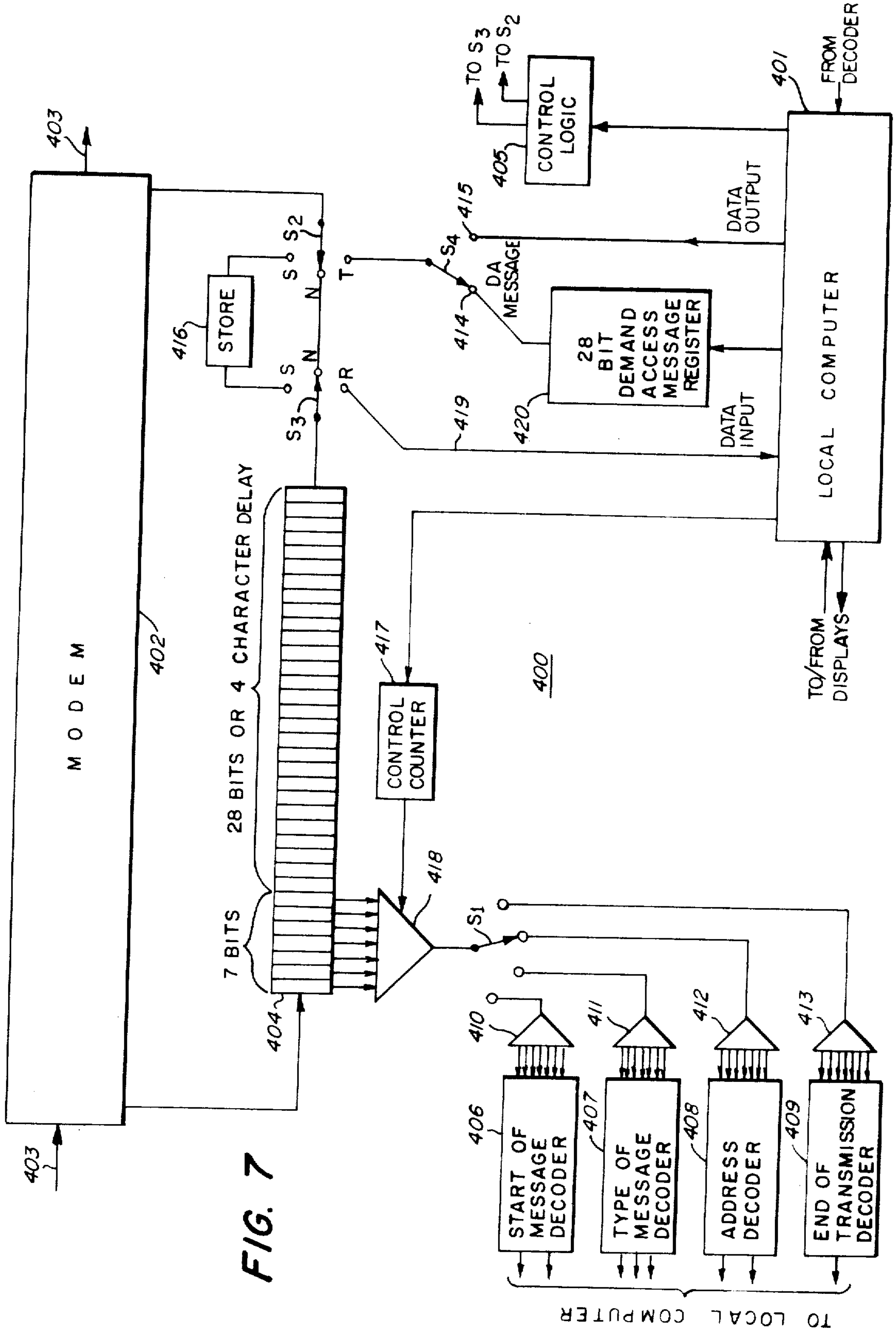
FIG. 7 shows an embodiment of the present invention including a shift register delay.

FIG. 7 shows an additional embodiment of a terminal interchange in which Demand Access is provided by inserting the Request to Send message ahead of the line transmission messages by means of a delay of the line messages. A local computer 401 controls the interchange of messages between the communications loop and the display controllers.

The terminal interchange, shown generally at 400, contains two independent line channels which provide reclocking and retransmission of data in their respective communications loops. Each line channel individually resynchronizes its own received synchronization from a data modern shown generally at 402, which may be a Western-Electric-type 20IBW2 data set. The sustained synchronization thus generated is used to synchronize the modem for full duplex operation.

The incoming data stream passes on line 403 from a demodulator portion of the modem (not shown) which is part of modem 402, through a delay shift register shown generally at 404 and through switches S2 and S3 to a modulator portion of the modem (not shown), and back on to the communications loop along line 403.

Under normal operating conditions, when a particular station does not have any messages to send, the incoming data stream is delayed along the communications path as described, is resynchronized and passed along the path. When a Request To Send (RTS) signal arrives at control logic 405 in the terminal interchange, the line availability is checked. If the line is available, then S3 switches to the transmit (T) position and a 28-bit Demand Access message is transmitted to the modulator portion of the modem and modulated on the carrier along line 403 to the central computer. This message requests access to the stored data in the central computer and, as will be explained, cannot overlap other messages which may be present in the communications loop. After the Demand Access message is sent, S3 returns to the N position. For switch S3 to switch to the T position, three condition must exist: a Request To Send signal must be received at the control logic 405; no Start of Message signal may be present in the delay shift register 404; and sufficient time must have elapsed since the last Request To Send message also transmitted for the new Request To Send message to be transmitted without overlap. Thus, if there is a Request To Send and a clear line, the Demand Access message is sent, thereby preventing interaction of the Demand Access message with other Demand Access messages which may be sent.

It is possible that just as the Demand Access message started, an incoming message from the modem could be entering the shift register. Under such condition, a Start of Message Decoder 406 will detect the first seven bits of this message in the first quarter of shift register 404 and the message will proceed through the entire 28-bit portion of the register. Since the Demand Access message, which is stored in register 420, is also 28 bits, as S3 returns to the N position, the first bit of the incoming message is ready to pass through to the modulator portion of the modem. Thus, by sending the Demand Access message through S3 at exactly 28-bit times before the arrival of an incoming message as detected by Start of Message Decoder 406, the delay will prevent message overlap in a terminal that has two messages to handle, line and remote location, and one transmission path. At the same time, the demand for line time to the computer is initiated without using a polling routing directed by the computer. The first 7 bits which represent a complete character of an incoming message in delay 404 activates switch S1, which transmits this character to gates 410 through 413 to one of four message decoders, through gating in circuitry, Start of Message Decoder 406, Type of Message Decoder 407, Address Decoder 408 or End of Message Decoder 409 respectively.

When a start of message character is recognized, Switch S1 is then advanced to Type of Message Decoder 407, seven bits later to the Address Decoder 408 and seven bits later to the End of Message Decoder 409. Switch S1 is reset to the Start of Message Decoder position after the end of message character is decoded; or if the message was a Demand Access message, passing through switch S3 or a Clear to Send message received from the central computer unit in response to the Demand Access request to send message. Any of these conditions will reset switch S1 but only after the type of message decoder 407 has determined the type of message present.

When the central computer receives the Demand Access message from a local station, in effect that station is asking to be polled and the Clear To Send message will be sent to that local station in accordance with the programming of the central computer, thus enabling the central computer to regulate traffic on the line while at the same time allowing the local stations to initiate their own polling. Upon receipt of a Clear To Send message with the appropriate local address header, control logic 405 causes switch S2 to be switched from the N position which allows messages on the loop to pass through the delay 404 and out along the line through the modem to the T position while simultaneously switching S4 from the Demand Access position 414 to the message position 415, and messages collected at the terminal interchange local computer 401 are transmitted through S4 and S2 to the central 405 causes switch S2 to be switched from the N position which allows messages on the loop to pass through the delay 404 and out along the line through the modem to the T position while simultaneously switching S4 from the Demand Access position 414 to the message position 415, and message collected at the terminal interchange local computer 401 are transmitted through S4 and S2 to the central computer.

At the end of transmission, switches S2 and S4 are reset. During the time when messages were being transmitted from the terminal interchange, Demand Access messages which may have been initiated are stored in register 416 since Switch S3 in accordance with the control logic is moved to the S position thereby placing these messages in storage register 416. When switch S3 switches to the S position, the stored messages are send through the modem and out along line 403. The line availability control is derived from the data decoding in decoders 406 through 409 via switch S1. When a start of message code is detected, the line available level is changed to Not Available. This is reset when S1 is reset to the start of message decoder position.

An additional mode of operation is that for receiving messages to be delivered to the local computer 401. When Switch S1 steps along and the type of message data and the local address is decoded, then switch S2 is switched to the R position and the message is directed along line 419 to the terminal interchange data input gate (not shown). Switch S2 is not reset until 7 + 28 bits after the end of transmission is detected which assures that the incoming message clears the delay shift register 404. When the data is switched at the terminal interchange, it does not continue via switch S3 to the modem output and, thus, the line is cleared of the message, making the line time available for other local stations to insert either Demand Access messages or full-length messages on the line in accordance with the control provided by the central computer. Of course, switches S1 through S4 are by way of explanation only, and logic circuitry of the integrated-circuit-type may be employed.

While particular embodiments of the invention have been shown and described, various modifications thereof will be apparent to those skilled in the art, and, therefore, it is not intended that the invention be limited to the disclosed embodiments or to details thereof, and departures may be made therefrom within the spirit and scope of the invention as defined in the appended claims.

What is claimed is:

1. In a data-communications system including a central signal-utilizing station and a plurality of remote stations serially connected on a transmission line to the central station;

delay means at each remote station for delaying data which may be present on the transmission line;

first signal-generation means at each remote station;

second signal-generation means at each remote station;

means for transmitting a signal from said first signal-generation means over said transmission line to the central signal utilizing station during the delay interval; and enabling means at the central signal-utilizing station responsive to said first generated signal for enabling the transmission of said second signal over the transmission line without overlap on other signals which may be on the transmission line.

2. A data-communications system in accordance with claim 1, wherein said enabling means includes storage means for storing data during transmission of said second signal from the remote station.

3. A data-communications system in accordance with claim 1, wherein said delay means comprises a shift register.

4. A data-communications system in accordance with claim 1, wherein said delay is of substantially equal time duration as said first generated signal.

5. A data-communications system in accordance with claim 1, wherein said delay is of greater time duration than said first generated signal.

6. A data-communications system in accordance with claim 3, wherein the bit length of said first generated signal is equal to the number of bits shifted by said shift register.

7. A data-communications system in accordance with claim 3, wherein the bit length of said first generated signal is less than the number of bits shifted by said shift register.

8. A data-communications system in accordance with claim 1, wherein said first signal is a coded access demand and said second signal is a message to be transmitted along the transmission line to the central signal-utilizing station.

9. In a communications loop containing a central computer and a plurality of remote stations, each remote location containing a transmitter and a receiver, the improvement comprising:

delay means at each remote location for delaying data on said communications loop for a delay equal to the message length of a message introduced during said delay at said remote location.

10. A system for use with a remote source of calculated data in a communications loop comprising:

a receiver;

a transmitter; and means including a delay in the communications loop between said transmitter and said remote source of calculated data for insertion of additional data into said transmission loop.

11. A system in accordance with claim 10 whereby said message inserted into the communications loop at the remote source is of a length equal to or less than said delay and further including:

means for sampling data on said transmission line;

means for insertion of said remote station message ahead of said sample data; and control means responsive to said sample data for controlling said data insertion means to insert said additional message ahead of said sampled and delayed data.

12. A system for use with a remote source of calculated data in a communications loop comprising:

at least one receiver;

at least one transmitter;

a delay in the communications loop between the transmitter and the remote source of calculated data;

first data-insertion means for provision of a signal of predetermined duration ahead of delayed data in the communications loop for transmission to the remote source; and second data-insertion means responsive to the remote source for the insertion of additional data into the communications loop after the remote source has received the signal from the first data-insertion means.

13. A system in accordance with claim 12 wherein the duration of said signal of predetermined duration is equal to the delay in the communications loop.

14. In a data-processing system wherein data control words associated with each of a plurality of peripheral subsystems are employed to control information transfer between memory and the corresponding peripheral subsystem, the improvement comprising:

a communications loop;

delay means at at least one peripheral subsystem;

data-generation means at at least one peripheral subsystem; and means associated with said delay means for controlling said data-combining means whereby data present on the line and peripherally generated data may be present simultaneously in said delay means without overlap.

15. A data-communications system comprising:

a central computer containing a central source of data;

a plurality of remote stations connected on a transmission line to the central computer, each remote station including a remote computer;

a plurality of data sources at each remote station;

means at each remote station for independently initiating transmittal of data at said central computer to the remote station; and means at each remote station for preventing message overlap on said transmission line among the plurality of remote stations.

16. a data-communications system comprising:

a first storage means;

second storage means;

third storage means;

a data-transmission line serially connecting said first, second and third storage means;

means at said second and said third storage means for transmitting a first and second signal of predetermined length respectively to said first storage means;

means at said first storage means for receiving said first and second signals and for transmitting third and fourth signals of predetermined length in response thereto to said second and third storage means respectively;

means at said second and third storage means for receiving said third and fourth signals respectively and for transmitting fifth and sixth signals of variable length respectively to said first storage means in response to said third and fourth signals;

means at said storage means for receiving said fifth and sixth signals and for transmitting seventh and eighth signals of variable length respectively in response thereto;

means at said second and third storage means for receiving said seventh and eighth signals respectively; and means at said second and third storage means for inhibiting the transmission of said first and second signals when other signals are present on said transmission line and for inhibiting said fifth and sixth signals until said third and fourth signals are received at said second and third storage means respectively.

17. A data-communications system comprising:

first storage means;

second storage means;

third storage means;

a data-transmission line connecting said first, second and third storage means;

means at said second and said third storage means for transmitting a first and second signal of predetermined length respectively to said first storage means;

means at said first storage means for receiving said first and second signals and for transmitting third and fourth signals of predetermined length in response thereto to said second and third storage means respectively;

means at said second and third storage means for receiving said third and fourth signals respectively and for transmitting fifth and sixth signals of variable length respectively to said first storage means in response to said third and fourth signals;

means at said storage means for receiving said fifth and sixth signals and for transmitting seventh and eighth signals of variable length in response thereto;
means at said second and third storage means for receiving said seventh and eighth signals respectively; and
means at said second and third storage means for inhibiting the transmission of said first and second signals when other signals are present on said transmission line and for inhibiting said fifth and sixth signals until said third and fourth signals are received at said second and third storage means respectively.

18. A data-communications system comprising:
first storage means;
second storage means;
third storage means;
a data-transmission line serially connecting said first, second and third storage means;
means at said second and said third storage means for transmitting a first and second signal of predetermined length respectively to said first storage means;
means at said first storage means for receiving said first and second signals and for transmitting third and fourth signals of predetermined length in response thereto to said second and third storage means respectively;
means at said second and third storage means for receiving said third and fourth signals respectively and for transmitting fifth and sixth signals of variable length respectively to said first storage means in response to said third and fourth signals;
means at said storage means for receiving said fifth and sixth signals; and
means at said second and third storage means for inhibiting the transmission of said first and second signals when other signals are present on said transmission line and for inhibiting said fifth and sixth signals until said third and fourth signals are received at said second and third storage means respectively.

19. A data-communications system comprising:
a central data-storage means;
a plurality of remote locations each connected to said central data-storage means in a communications loop and each remote location including a local data-storage means;
means at each remote location for independently transmitting a message of a predetermined number of data bits to said central data-storage means; and
control means at each remote location for controlling said last-mentioned means to inhibit transmission of said message when overlapping of other data on said transmission line would occur by the transmission of said message.

20. A data-communications system in accordance with claim 19, further comprising:
a plurality of cathode-ray tube display terminals at each remote location, each of said terminals being capable of generating and receiving digital information independently of the other terminals at said remote location;
multiplexing means at each remote location for polling each of said display terminals; and
control means at each remote location for receiving a multiplexed input from said multiplexer of said digital information from said display terminals, said control means further comprising means for enabling the transmission of said message upon the receipt of said multiplexed digital information.

21. A Data-communications system in accordance with claim 20, wherein said control means is a digital computer and said means for inhibiting transmission of messages includes a priority interrupt of the program of said computer.

22. A data-communications system in accordance with claim 21, further including:
means at said central data-storage means including a programmed digital computer for controlling the transmission of data from said central data-storage means to each remote location;
means controlled by said last-mentioned digital computer for transmitting an additional message of a predetermined number of data bits in response to said first-mentioned message of a predetermined number of data bits to said control means at each remote location; and
means at each remote location for generating an additional program interrupt in response to said additional message of a predetermined number of data bits whereby said digital information generated at said display terminals is transmitted to said central data storage means and the transmission of other data from other remote locations is inhibited until the end of said last-mentioned transmission.

23. A data-communications system in accordance with claim 22, further comprising:
means at said central data-storage means for a block of data in response to the receipt at said central data-storage means of the data transmission from each remote location containing the multiplexed digital information from said display terminals associated with each remote location and means at each remote location for receiving said block of data and for decoding said block of data in accordance with the particular display terminal to which it is addressed.

24. A data-communications system comprising:
a central computer containing a central source of data;
a plurality of remote stations connected on a transmission line to the central computer, each remote station including a remote computer;
a plurality of data sources at each remote station;
means at each remote station for independently transmitting data to and receiving data from central computer; and
means at each remote station for preventing message overlap on said transmission line among the plurality of remote stations.

25. A data-communications system in accordance with claim 24, wherein said means at each remote station for independently transmitting data to and receiving data from said central computer includes a plurality of display terminals.

26. A data-communications system in accordance with claim 25, wherein said display terminals are cathode-ray tube display terminals.

27. A data-communications system in accordance with claim 25, further comprising multiplexing means associated with said plurality of display terminals for preventing message overlap among said plurality of display terminals.

28. A data-communications system comprising:
a central computer containing a central source of data;
a plurality of remote stations connected on a transmission line to the central computer, each remote station including a remote computer;
a plurality of data sources at each remote station;
means at each remote station for independently transmitting data to and receiving data from other remote stations; and
means at each remote station for preventing message overlap on said transmission line among the plurality of remote stations.

* * * * *

UNITED STATES PATENT OFFICE
CERTIFICATE OF CORRECTION

Patent No. 3,633,169 Dated January 4, 1972

Inventor(s) William J. Bickford

It is certified that error appears in the above-identified patent and that said Letters Patent are hereby corrected as shown below:

On the Title Page, after "Attorneys—Milton D." change "Barlett" to -- Bartlett --.

In the Specification

Column 1, lines 32 & 33, change "is present" to -- permits --

Column 2, line 35, change "which" to -- by --.

Column 2, line 41, change "terminal" to -- central --.

Column 2, line 43, change "parallel" to -- receiver --.

Column 2, line 45, change "station" to location. --.

Column 4, line 5, change "location" to -- local --.

Column 4, line 22, change "location" to -- local --.

Column 4, line 61, after "station" insert -- A --.

Column 5, line 15, change "modern" to -- modem --.

Column 5, line 44, change "high-spped" to -- high-speed --.

Column 8, line 6, omit -- at --.

Column 8, line 28, change "(OA, OB, OC and OD)." to --ϕA, ϕB, ϕC and ϕD). --

Column 8, line 44, change "7" to -- 7th --.

UNITED STATES PATENT OFFICE

CERTIFICATE OF CORRECTION

Patent No. 3,633,169 Dated January 4, 1972

Inventor(s) William J. Bickford

It is certified that error appears in the above-identified patent and that said Letters Patent are hereby corrected as shown below:

Column 11, line 66, change "Operation" to -- Operational --.

Column 11, line 67, change "couple" to -- coupled --.

Column 12, line 54, change "replay" to -- reply --.

Column 12, line 72, change "characters" (first occurrence), to -- character --.

Column 13, line 15, change "LOGIC" to -- logic --.

Column 13, line 19, after "going" insert -- to the --.

Column 13, line 25, change "even" to -- event --.

Column 14, line 6, change "logical" to -- logic --.

Column 15, line 11, change "modern" to -- modem --.

Column 15, line 35, change "condition" to -- conditions --.

Column 16, line 20, omit -- 405 --.

UNITED STATES PATENT OFFICE
CERTIFICATE OF CORRECTION

Patent No. 3,633,169 Dated January 4, 1972

Inventor(s) William J. Bickford

It is certified that error appears in the above-identified patent and that said Letters Patent are hereby corrected as shown below:

Column 16, lines 21 to 27, omit "causes switch S2 to be switched from the N position which allows messages on the loop to pass through the delay 404 and out along the line through the modem to the T position while simultaneously switching S4 from the Demand Access position 414 to the message position 415, and message collected at the terminal interchange local computer 401 are transmitted through S4 and S2 to the central".

Column 16, line 34, change "S3" to -- S2 --.

Column 16, line 35, change "send" to -- sent --.

In the Claims

Column 18, line 26, Claim 16, change "a" to -- A --.

Column 18, line 27, Claim 16, omit "a".

Column 19, line 65, Claim 21, change "Data" to -- data --.

Column 20, line 39, Claim 23, after "from" insert -- said --.

Signed and sealed this 6th day of March 1973.

(SEAL)
Attest:

EDWARD M.FLETCHER,JR.
Attesting Officer

ROBERT GOTTSCHALK
Commissioner of Patents